(12) United States Patent
Arisa Busquets

(10) Patent No.: US 10,544,816 B2
(45) Date of Patent: Jan. 28, 2020

(54) COMPENSATION NUT

(71) Applicant: ILLINOIS TOOL WORKS INC., Glenview, IL (US)

(72) Inventor: Jaume Arisa Busquets, Sabadell (ES)

(73) Assignee: ILLINOIS TOOL WORKS INC., Glenview, IL (US)

( * ) Notice: Subject to any disclaimer, the term of this patent is extended or adjusted under 35 U.S.C. 154(b) by 235 days.

(21) Appl. No.: 15/538,222

(22) PCT Filed: Nov. 22, 2015

(86) PCT No.: PCT/US2015/062042
§ 371 (c)(1),
(2) Date: Jun. 21, 2017

(87) PCT Pub. No.: WO2016/105751
PCT Pub. Date: Jun. 30, 2016

(65) Prior Publication Data
US 2017/0335873 A1    Nov. 23, 2017

(30) Foreign Application Priority Data

Dec. 23, 2014 (ES) .................................. 201401038

(51) Int. Cl.
*F16B 43/02* (2006.01)
*F16B 5/02* (2006.01)
(52) U.S. Cl.
CPC .................................. *F16B 5/0233* (2013.01)
(58) Field of Classification Search
CPC .................................................... F16B 5/0233

USPC ....................................................... 411/546
See application file for complete search history.

(56) References Cited

U.S. PATENT DOCUMENTS

| 5,314,144 | A | 5/1994 | Porter, Jr. | |
|---|---|---|---|---|
| 8,066,465 | B2* | 11/2011 | Figge | F16B 5/025 411/34 |
| 8,202,033 | B2* | 6/2012 | Choi | B62D 25/147 411/535 |
| 8,240,966 | B2* | 8/2012 | Figge | F16B 5/0233 411/546 |

(Continued)

FOREIGN PATENT DOCUMENTS

| CN | 201293032 | 8/2009 |
|---|---|---|
| CN | 103003081 | 3/2013 |

(Continued)

OTHER PUBLICATIONS

PCT, International Search Report and Written Opinion, International Application No. PCT/US2015/062042; dated Feb. 2, 2016, 10 pages.

*Primary Examiner* — Gary W Estremsky
(74) *Attorney, Agent, or Firm* — Thompson Hine LLP

(57) ABSTRACT

A compensation nut formed by the assembly of a nut (2) and a bolt (3) and used to attach an application to a surface or panel while maintaining a variable distance between the surface and the supporting element or chassis in which the nut is attached, preventing this distance from collapsing when the application attachment bolt is tightened. The assembly includes a slightly flexible plastic annular body, such as an overmolded sleeve (9) of vulcanized plastic, held tightly in the cylindrical axial internal hollow of the bolt (3).

14 Claims, 2 Drawing Sheets

(56) References Cited

U.S. PATENT DOCUMENTS

| | | | | |
|---|---|---|---|---|
| 8,764,337 | B2* | 7/2014 | Binder | F16B 5/0233 |
| | | | | 224/326 |
| 8,864,432 | B2* | 10/2014 | Figge | F16B 5/025 |
| | | | | 411/383 |
| 2005/0047893 | A1* | 3/2005 | Schwarzbich | F16B 5/0233 |
| | | | | 411/546 |
| 2006/0226312 | A1* | 10/2006 | Masuch | F16B 5/0233 |
| | | | | 248/188 |
| 2013/0074325 | A1 | 3/2013 | Tredan | |
| 2015/0330435 | A1* | 11/2015 | Schwarzbich | F16B 5/0283 |
| | | | | 411/16 |

FOREIGN PATENT DOCUMENTS

| | | |
|---|---|---|
| DE | 20314003 | 11/2003 |
| EP | 1217222 | 6/2002 |
| EP | 1970574 | 9/2008 |
| EP | 2796729 | 10/2014 |
| WO | WO 2014/120707 | 8/2014 |

* cited by examiner

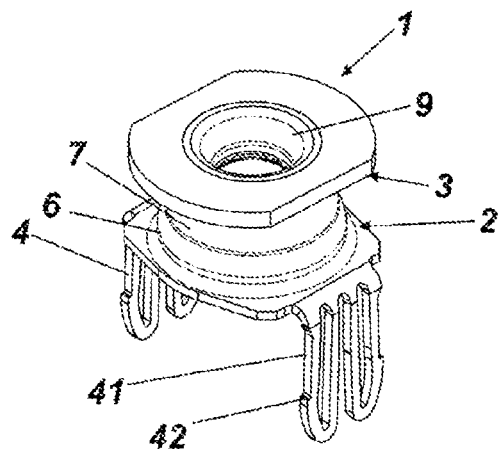
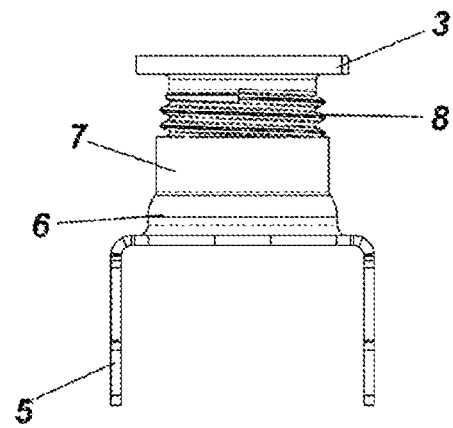
Fig. 1  Fig. 2
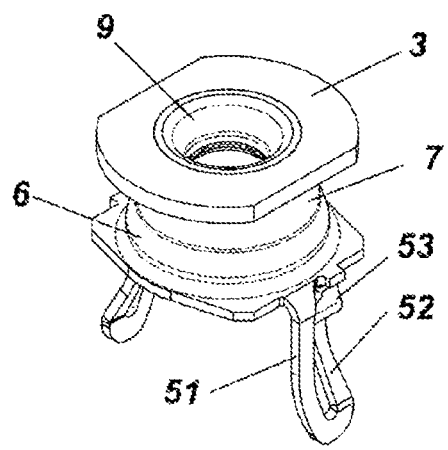
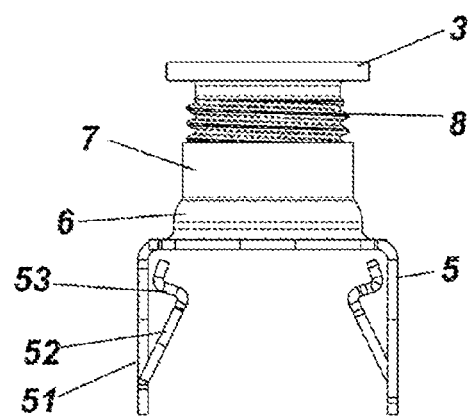
Fig. 3  Fig. 4

COMPENSATION NUT

SCOPE OF THE INVENTION

The present invention relates to a compensation nut, compensation nuts being nut-and-bolt assemblies used to attach an application to a surface or panel while maintaining a variable distance between said surface and the supporting element or chassis in which the nut is attached, preventing this distance from collapsing when the application attachment bolt is tightened, with an improved connection between the application attachment bolt and the bolt of the compensation nut.

BACKGROUND

Compensation nuts used to attach an application to a panel or bearing surface for said application that make it possible to maintain the variable space between said panel and the frame or support surface in which said nut is anchored are known.

These nuts incorporate a bolt with a hollow interior. This bolt is screwed onto the thread of the nut, which is inverted, i.e. the dextrorotary movement of the bolt causes same to move backwards and the levorotary rotation of same causes the bolt to move into the nut.

The inside of this hollow bolt has engagement members so that, when the bolt used to attach the application is inserted, rotating said application attachment bolt also drags (rotates) the bolt of the compensation nut.

In the known operation of this type of nut, when the application bolt is screwed into the hollow of the bolt of the compensation nut, this dextrorotary rotation firstly causes the backward movement of the bolt of the compensation nut until the entire separation space between the panel supporting the application and the frame or chassis of the vehicle in which the compensation nut is attached has been covered, as mentioned above.

Continuing to tighten the application attachment bolt secondly causes the forward movement of said bolt into the bolt of the compensation nut and attachment of the application to be installed.

Patent EP2796729 describes a compensation nut of the type described in which the bolt of the compensation nut has internal connection members formed by legs oriented from the surface towards the axial shaft of said bolt. The design of this nut is complex because, since the thickness of said bolt of the compensation nut is limited, external zones of the thread of said bolt have to be sacrificed to provide material for said internal connection elements.

One of the problems with the solution described relates to the deterioration of the thread of the application attachment bolt caused by friction of the internal metal legs of the compensation bolt. This prevents re-use of the assembly installed.

The primary objective of the present invention is to provide a simpler, cheaper and more efficient means for facilitating threaded engagement or locking of the application attachment bolt in the bolt of the compensation nut, without damaging said bolt.

Another of the objectives of the present invention is to provide a compensation nut that is lighter overall and cheaper to manufacture.

This and other advantages of the present invention are set out in the description provided below.

SHORT DESCRIPTION OF THE INVENTION

The present invention relates to a compensation nut, compensation nuts being nut-and-bolt assemblies used to attach an application to a surface or panel while maintaining a variable distance between said surface and the supporting element or chassis in which the nut is attached, preferably used in the automobile industry, in which a plastic overmolding is applied to the internal wall of the hollow bolt, said overmolding having a conical end, at the insertion aperture for the application attachment bolt, before narrowing into a cylindrical body of lesser hollow section than the previous body.

In the preferred embodiment, the compensation nut is made of metal and specifically a treated material such as carbon steel. The part may be treated against corrosion.

The nut part of the compensation nut includes, in the preferred embodiment of same, attachment springs to the orifice or slot formed in the attachment surface, and has two groups of two legs on each side that are joined at the end of same and aligned such that two of said legs on one side are internal and face one another and the other two legs are external and act elastically to lock against the edge of the slot. The material used to form said spring (carbon steel) results in a tight and firm attachment leaving no clearance in the orifice of the slot of the attachment surface, and which adequately withstands the working vibrations of the part. This is substantially different from other attachments for similar uses in which the attachment elements are substantially rigid and do not tightly fit the orifice or adequately withstand the vibrations of the vehicle.

It should also be noted that the arrangement of the springs in the present invention, which act as attachment elements and are aligned in pairs on either side of the nut, enable the part to be positioned correctly.

The nut also includes an internally threaded cylinder the base of which is joined to the base surface of the nut by a dome-shaped structure that provides elasticity to the part and adequate residual stress in consideration of the stress forces when working the compensation nut.

The compensation nut includes a hollow bolt with an upper flange from which the shaft of the bolt originates. The thread of said bolt and the thread of the nut match so that they can be screwed together, in the inverse direction to the standard direction. When the bolt is rotated rightwards (dextrorotary), the bolt moves backwards. When the bolt is rotated leftwards (levorotary), the bolt moves forwards. All of the foregoing is provided for the purpose of the compensation function described above.

The internal cylindrical wall of said hollow bolt has hooks oriented downwards and indentations. Both elements provide, when the plastic is overmolded as a sleeve in the hollow of the bolt, gripping zones between the overmolding and the bolt that prevent any relative movement once the overmolded plastic has cooled, shrinking axially.

The inventive objectives sought are achieved in this manner, resulting in a compensation nut that is cheap and made of lightweight material, since the metal parts are made from a laminar surface, by deformation and punching, and on account of the structural arrangement of same.

SHORT EXPLANATION OF THE DRAWINGS

To better explain the invention, this description is accompanied by two sheets of drawings provided solely as non-limiting illustrations of the invention.

FIG. 1 is a perspective view of a compensation nut according to the present invention.

FIG. 2 is a perspective view from one side of the compensation nut in the previous figure, showing a possible elevation of the bolt in relation to the nut.

FIG. 3 is a perspective view of another example embodiment of a compensation nut according to the present invention, in which the legs of the nut are different from the example shown in the previous figures.

FIG. 4 is a view similar to the view in FIG. 2, with the bolt elevated, but this time with reference to the embodiment in FIG. 3.

DETAILED EXPLANATION OF THE INVENTION

Figure 5:
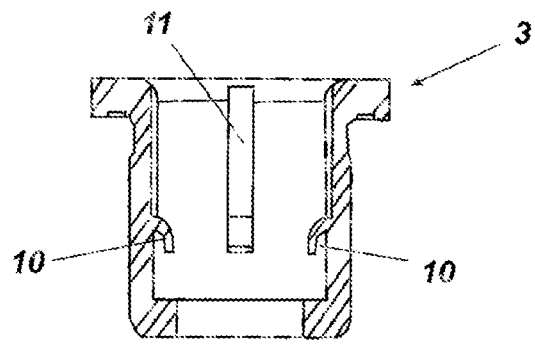
FIG. 5 is a cross-section of the bolt portion of the compensation nut.

The present invention relates to a compensation nut formed by the assembly of a nut (2) and a bolt (3) and used to attach an application to a surface or panel while maintaining a variable distance between said surface and the supporting element or chassis in which the nut is attached, preventing this distance from collapsing when the application attachment bolt is tightened.

In one of the preferred embodiments of the invention, the nut (2) is formed by a base from which descend elements for attachment to the support surface, for example the chassis of the vehicle. These attachment elements may be of different types and forms. FIG. 1 shows descending springs formed by pairs of legs joined at the ends of same. These pairs of legs are aligned, on either side of the nut, in a single line, two of said legs (one from each group) therefore being an external leg. When said springs (4) are inserted into the attachment slots provided in the attachment surface, these external legs act elastically as a spring, being compressed against the edge of the orifice.

These external legs (41) also have a recess or step (42) that acts as a disengagement stop in relation to the attachment surface. This type of structure is very favorable for the compensation nut according to the invention since it enables the nut to grip the attachment surface without any clearance and from any penetration length in the slot provided in the attachment surface.

In other possible embodiments of the invention, for example the embodiment shown in FIGS. 3 and 4, other types of gripping elements may be used, such as legs (5) with a descending section (51) and an ascending continuation (52) that acts flexibly against the face of the attachment surface that has been passed, by means of a surface (53).

In the present invention, the compensation nut 1 is metal and preferably made of carbon steel. It may have been treated against corrosion and/or have a coating such as a nickel coating. The nature of the material used to make the compensation nut (1) ensures that the attachment of the attachment elements (4 and 5) to the slot in the attachment surface is simultaneously a firm and tight attachment with no clearance, maintaining good elastic behavior in response to the vibrations of the vehicle, for example, and unlike the prior art in which the substantial lack of plasticity and rigidity of the joining of same facilitate the disconnection from the attachment support of the compensation nut (1).

The nut (2) has, projecting outwards in the opposite direction to the legs (5) and springs (4), a cylinder (7) with an internal thread, the join with the starting base being formed by a dome (6) or tapered body with a circular base and walls with a curved section. This arrangement affords elasticity and resistive stress to the whole of the nut (2) against the forces and stresses it is subjected to when in use.

The direction of the internal thread of the cylinder (7) is opposite to the normal thread direction. Consequently, when a bolt is rotated to the right in said thread it moves away from the base of the nut, and when it is rotated in a levorotary direction, to the left, it is tightened.

This nut (2) is complemented by a bolt (3) the inside of which forms an axially hollow cylinder, said bolt having an external thread counteracting the thread of the nut (2) into which it is screwed. As shown in the embodiments in the figures, this bolt has an upper base or surface from which the shaft of the bolt (3) originates.

FIGS. 1 and 3 show the compensation nut (1) in a closed and in-service position, in which the height of the part is minimal, i.e. not entirely screwed in and tightened to the nut in order to enable it to be easily unscrewed, the bolt (3) having a very limited gap. Conversely, in FIGS. 2 and 4, the same compensation nut (1) is in an open position, with a greater height equivalent to the space to be covered between panel and chassis.

Figure 6:
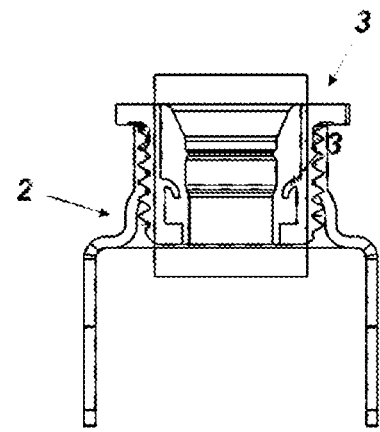
FIG. 6 is a cross-section of the whole of the compensation nut.
Figure 7:
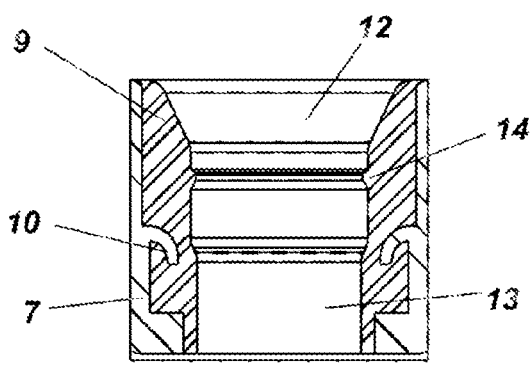
FIG. 7 is a magnified detail of the central portion of the cross-section in the previous figure.

The present invention includes an overmolded portion (9) made of a suitable plastic in the cylindrical axial hollow inside the bolt (3) that is conical in the direction of the position of the nut (2), as shown in FIG. 6 and in the detail in FIG. 7. In other words, it has a first section (12) that is wider in terms of free diameter inside same than a second section (13) having a narrower internal aperture.

To prevent the clearance of the application attachment bolt in the initial conical section (12) requiring same to be held to prevent it falling, this section has a circular annular projection (14) that elastically holds this application bolt to prevent same from falling.

This cone of overmolded plastic material (9) inside the bolt (3) with a free section that is considerably smaller than the free section of the application attachment bolt (not shown) shows how this bolt strongly grips said overmolding (9), interferes with the overmolding (9), engaging with same and enabling the rotation of the hollow bolt (3) in the nut (2). The first larger section (12) of the hollow in said overmolding (9) enables the application attachment bolt to be positioned within the bolt (3).

The plastic material used is hard enough to perform the function of same and is also flexible, like hard rubber, because it has been vulcanized in the preferred embodiment. When the application bolt enters the section of the overmolding that is narrower than said bolt, the thread of same presses against the plastic, interfering with said material. This enables the compensation bolt (3) to be dragged by the application bolt. Furthermore, when the application bolt is withdrawn from the compensation bolt (3), said compensation bolt (3) can be reused because the elasticity of the plastic has been compressed and the surface of same has only been partially eroded. Indeed, no less than ten installation and removal operations are possible with the compensation nut according to this embodiment.

In another possible embodiment, the invention provides for a part similar to the overmolding (9) to be pressed into the inside of the bolt (3). Naturally, the internal surface of the bolt (3) can be varied to better suit this embodiment, along with the type of plastic material used, to improve adherence to the bolt (3). Similarly to the previous case, the application bolt works against said plastic material by interference and not by friction, enabling the device to be reused.

When an application is attached by screwing, locking the attachment bolt in the overmolding (9), this rotation firstly causes the rotation by dragging of the bolt (3), which expands the height of the compensation nut (1), as shown in FIG. 2 for example, until the entire hollow between the panel and the surface of the chassis is covered.

Once rotation of the application attachment bolt no longer permits expansion of the compensation nut (1), the application is then attached by screwing, this bolt penetrating the hollow bolt (3).

The application is removed by inverting the process. The levorotary rotation of the application bolt contracts the compensation nut (1), which once closed cannot move any further in that direction, such that subsequent rotations release the attachment of the application and extract the application attachment bolt from the hollow of the bolt (3).

This characteristic arrangement of the present invention is very beneficial, since not only is it simple to manufacture (being free of the structural complexities of the prior art), but it also provides a good grip of the application bolt, which enables the hollow bolt (3) to be dragged without thereby damaging said application bolt, thereby enabling the parts to be reused.

However, realization of this convenient solution required apparently insuperable obstacles to be overcome. Understandably, since the rotation of the overmolding (9) has to be able to drag the hollow bolt (3) by rotating same, there must be a good join between the overmolding (9) and the body of the hollow bolt (3). However, the technique of overmolding the plastic in the form of an internal sleeve in the hollow of the bolt (3) presents the difficulty that the plastic contracts when it cools, and it does so not by expanding towards the walls of the hollow bolt (2), but by contracting towards the axial shaft of said bolt, losing the join with same.

The solution to this drawback is to provide gripping elements in the hollow inside of said bolt (3) in which the overmolding (9) is attached, enveloping and filling same. This involves creating hooks (10) in the walls of the inside of said hollow bolt (3). These hooks (10) are oriented towards the position of the nut (2), preventing the overmolding (9) from coming out.

It should also be taken into account that both the nut (2) and the hollow bolt (3) are made from a laminar material by deformation and punching. The part is made as light as possible so that, in consideration of the qualities of the structural material and the treatments it may receive, it provides suitable mechanical behavior in accordance with the function it is intended to perform.

Consequently, the hooks (10) are made from the material forming the walls of the hollow bolt (3). As shown in FIG. 3, this can be done by hollowing material from the internal wall of the bolt (3), creating an indentation (11) above said hooks (10). Both the indentations (11) and the respective hooks (10) provide excellent anchoring points for the overmolding (9) such that, despite the slight shrinkage of said overmolding (9) caused by cooling, the join and grip between same and the bolt (3) is not lost.

The structure of the compensation nut (1) according to the present invention simplifies the conventional installation of same using automatic tightening tools. The operative places the compensation nut in the hollow to be covered and presents the application bolt through the supporting element of said application, before screwing in the assembly. In practice, this is done in a single screwing operation in which the operative can tighten the compensation nut (1) described at high speed, even 900 rpm, which is possible on account of the performance of the part and the interference between said application bolt and the plastic overmolding (9) which provides excellent tractive grip.

It is understood that any details of finish and form that do not alter the essence of the invention may vary in this case.

The invention claimed is:

1. A compensation nut formed by an assembly of a nut (2) and a bolt (3) and used to attach, using an application attachment bolt, an application to a surface or panel while maintaining a variable distance between said surface or panel and a supporting element or chassis in which the nut is attached, preventing the variable distance from collapsing when said application attachment bolt is tightened, wherein the compensation nut includes a slightly flexible plastic annular body (9) held tightly in a cylindrical axial internal hollow of said bolt (3), wherein an internal wall of said bolt (3) of the compensation nut (1) has hooks (10) oriented towards the position of the nut (2), said hooks (10) being covered by said plastic annular body (9).

2. The compensation nut as claimed in claim 1, wherein said plastic annular body (9), has a first conical portion (12) followed by a second portion (13), the second portion having a smaller internal diameter than the first conical portion.

3. The compensation nut as claimed in claim 1, wherein said plastic annular body (9) has an annular projection (14) for retaining the application attachment bolt.

4. The compensation nut as claimed in claim 1, wherein the internal wall of said bolt (3) of the compensation nut (1) has indentations (11) covered by said plastic annular body (9).

5. The compensation nut as claimed in claim 1, wherein said plastic annular body (9) is an overmolded sleeve of vulcanized plastic.

6. The compensation nut as claimed in claim 1, wherein said nut (2) is formed by a base from which descend flexible elastic springs or legs (4, 5).

7. The compensation nut as claimed in claim 6, wherein said nut (2) has, projecting outwards in the opposite direction to said flexible elastic springs or legs (4, 5), a cylinder (7) with an internal thread, wherein the cylinder is joined with the base by a dome (6) or tapered body with a circular base and walls with a curved section.

8. The compensation nut as claimed in claim 7, wherein said springs (4) are formed by groups of two pairs of legs joined at the ends thereof, said springs (4) being aligned in pairs in a single line on either side of said nut (2).

9. The compensation nut as claimed in claim 8, wherein the external legs (41) of said springs (4) have a recess or step (42).

10. The compensation nut as claimed in claim 7, wherein said flexible elastic legs (5) have a descending section (51) and an ascending continuation (52).

11. The compensation nut as claimed in claim 1, wherein said bolt (3) has an upper base or surface from which a shaft of the bolt originates.

12. The compensation nut as claimed in claim 1, wherein a thread of said bolt (3) and the internal thread of the cylinder (7) of said nut (2) match to enable said bolt and said nut to be screwed together in a direction opposite a tightening direction of the application attachment bolt.

13. A compensation nut formed by an assembly of a nut and a bolt and useful for attaching, via use of an application attachment bolt, an application to a surface or panel while maintaining a variable distance between said surface or panel and a supporting element or chassis in which the nut is attached, the compensation nut configured to prevent the variable distance from collapsing when said application attachment bolt is tightened, wherein the assembly includes a slightly flexible plastic annular body held tightly in a cylindrical axial internal hollow of said bolt, wherein said nut includes a base, wherein a first flexible elastic leg and a second flexible elastic leg are aligned and extend from a first side of said base, wherein a third flexible elastic leg and a fourth flexible elastic leg are aligned and extend from a second side of said base, wherein said second side is opposite said first side, wherein the first flexible elastic leg includes a first step and the second flexible elastic leg includes a second step, wherein the third flexible elastic leg includes a third step and the fourth flexible elastic leg includes a fourth step;

wherein said plastic annular body, in the wall of the internal hollow of said bolt, has a first conical portion followed by a second portion, the second portion having a smaller internal diameter than the first conical portion.

14. The compensation nut as claimed in claim 13, wherein said plastic annular body has an annular projection for retaining the application attachment bolt.

* * * * *